United States Patent
Ramirez et al.

(10) Patent No.: US 6,697,014 B1
(45) Date of Patent: Feb. 24, 2004

(54) SYNERGISTIC METHOD FOR ASSESSING AN ELECTROMAGNETIC RADIATING TUBE SYSTEM

(75) Inventors: Ayax D. Ramirez, Chula Vista, CA (US); Stephen D. Russell, San Diego, CA (US); David W. Brock, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/302,318

(22) Filed: Nov. 20, 2002

Related U.S. Application Data (63) Continuation-in-part of application No. 09/871,474, filed on May 31, 2001, now Pat. No. 6,489,919.

(51) Int. Cl.⁷ .................................................. G01S 7/40
(52) U.S. Cl. ...................................... 342/165; 342/173
(58) Field of Search ................................ 342/165, 173, 342/174

(56) References Cited

U.S. PATENT DOCUMENTS

| | | | | |
|---|---|---|---|---|
| 3,792,613 A | * | 2/1974 | Couture | 73/629 X |
| 4,554,636 A | * | 11/1985 | Maggi et al. | 702/118 |
| 5,375,126 A | * | 12/1994 | Wallace | 714/712 X |
| 6,489,919 B1 | * | 12/2002 | Brock | 342/165 |

FOREIGN PATENT DOCUMENTS

GB  2228577 A  *  8/1990

OTHER PUBLICATIONS

"Inverse analyses for natural and multicracks using signals from a differential transmit–receive ECT probe", Haoyu Huang; Takagi, T.; Magnetics, IEEE Transactions on, vol.: 38 Issue: 2, Mar. 2002 Page(s) 1009–1012.*

"DO muon proportional drift tube electronics test results", Baldin, B.; Diehl, H.T.; Haggerty, H.; Hansen, S.; Marshall, T.; Zieminski, A.; Nuclear Science Symposium, 1998. Conference Record. 1998 IEEE, Vol: 1 , Nov. 8–14, 1998 P(s): 607–612.*

* cited by examiner

*Primary Examiner*—John B. Sotomayor
(74) *Attorney, Agent, or Firm*—Peter A. Lipovksy; Michael A. Kagan; Allan Y. Lee (57) ABSTRACT

A system incorporating an electromagnetic radiating tube uses a plurality of sensors to assess the status of the system and integrates the data produced by these sensors in a way that enhances the effectiveness of the data versus analyzing the data separately. This method has uses in detecting and predicting failures in electromagnetic radiating devices such as microwave tubes, and may also be used for life-cycle monitoring of such devices.

11 Claims, 8 Drawing Sheets

SYNERGISTIC METHOD FOR ASSESSING AN ELECTROMAGNETIC RADIATING TUBE SYSTEM

CROSS-REFERENCE TO RELATED APPLICATION

This application is a continuation-in-part of U.S. patent application Ser. No. 09/871,474 filed on May 31, 2001, now U.S. Pat. No. 6,489,919 incorporated by reference herein.

BACKGROUND OF THE INVENTION

Electromagnetic radiating devices, such as microwave tubes, are used in a large variety of communications, RADAR, and surveillance systems. Examples of microwave tubes include linear beam types such as traveling wave tubes (TWT) and cross-field amplifiers (XFA). Other microwave devices include magnetron, klystron and solid state devices. The commonality for these devices is the emission of electromagnetic energy in the microwave, radio frequency (RF) or other band with wavelengths larger than the infrared region of the spectrum.

Typically microwave tubes are robust and very expensive, however since they are used in many critical systems they are routinely replaced prior to their failure to maximize system up-time. Furthermore, since few such systems incorporate built-in diagnostics, high-priced microwave tubes are often inadvertently replaced when in fact another component of the system is at fault. These approaches increase system operating costs as full-life usage of the tubes will often not be realized. Therefore, a need exists for a way to detect electromagnetic radiating tube failure so that useful tubes are not replaced prematurely.

SUMMARY OF THE INVENTION

A system incorporating an electromagnetic radiating tube uses a plurality of sensors to assess the status of the system and integrates the data produced by these sensors in a way that enhances the effectiveness of the data versus analyzing the data separately. This method has uses in detecting and predicting failures in electromagnetic radiating devices such as microwave tubes, and may also be used for life-cycle monitoring of such devices.

An object of this invention is to provide a technique for testing an electromagnetic radiating tube.

A further object of this invention is to provide a technique for testing an electromagnetic radiating tube system.

Still a further object of the invention is to provide a technique that tests the transmitting tube of a radar system.

Still yet another object of this invention is to provide a technique that tests the transmitting tube of a radar system by using a plurality of sensors.

Still a further object of this invention is to provide a technique that tests the transmitting tube of a radar system by exploiting a plurality of sensors in a way that enhances the effectiveness of the sensor data versus analyzing the sensor data separately.

Other objects, advantages and new features of the invention will become apparent from the following detailed description when considered in conjunction with the accompanied drawings.

DESCRIPTION

A plurality of sensors is used to sense operating conditions of an electromagnetic radiating tube system and hence an electromagnetic radiating tube incorporated therein. The data from the sensors is integrated to enhance the effectiveness of the sensor data versus analyzing the sensor data separately.

In this description, sensor data is described in terms of the parameter x. The term F is used to denote a characteristic signature of a failure of the system under test, and can be a function of more than one parameter, e.g., $(x_1, x_2, x_3, \ldots, X_i)$. The characteristic signature of the failure, F, can be written as $F=F(x_1, x_2, x_3, \ldots, x_i)=$ $$\sum_{i=1}^{n} \sum_{j=1}^{n} \sum_{k=0}^{\infty} \sum_{l=0}^{\infty} c_{ijkl} x_i^k x_j^l$$

where $C_{ijkl}$ are calculation coefficients, and $X_i^k$, $X_j^l$ correspond to each of an n number of sensor parameters.

Such an application is feasible as nearly all functions can be approximated by a polynomial expansion. For simplicity, if a failure is a function of just two parameters, then $$F=F(x_1, x_2)=a+bx_1+cx_2+dx_1x_2+ex_1^2x_2+fx_1x_2^2+\ldots$$

where the coefficients $(c_j)$ are represented by a, b, C, d, ... the functional parameters $(X_i)$ are represented by $X_1$ and $X_2$. Note that this expansion does not specifically require that the parameters have the same units, or that they appear correlated. Monitoring the value of F provides a measure of the electromagnetic radiating tube system status and/or may be used in identifying or differentiating failures associated with the system.

As will further be described, this approach to discerning the degradation of an electromagnetic radiating tube system allows one to "link" sensor information to provide a diagnostic technician with more information than will normally be derived from either individual sensor data or many combinations of such data.

While it is envisioned that a wide-range of sensors may be used to perceive the status of an operating electromagnetic radiating tube system, a few of these sensors will be described herein by example.

For example, a cathode current sensor may used to detect a current pulse signature that is characteristic of a failed radio frequency (RF) pulse from a magnetron. Such a current sensor may for example be a loop, toroid, giant magnetoresistance detector, and the like, which is coupled, inductively or otherwise, to the conductor carrying current to the cathode of the tube. A more detailed description of this sensing technique may be found in the above-cited U.S. Patent Application.

Figure 1A:
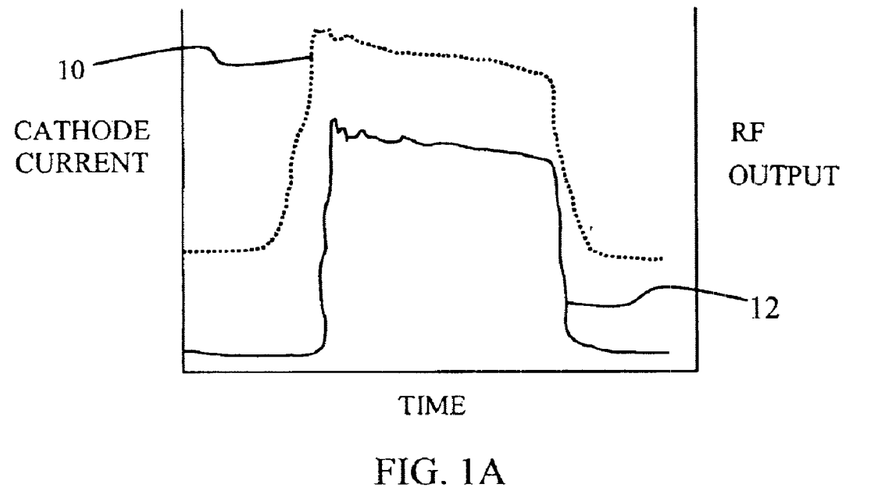
FIGS. 1A–1B illustrate current sensed from a non-degraded and degraded electromagnetic radiating source, respectively.
Figure 1B:
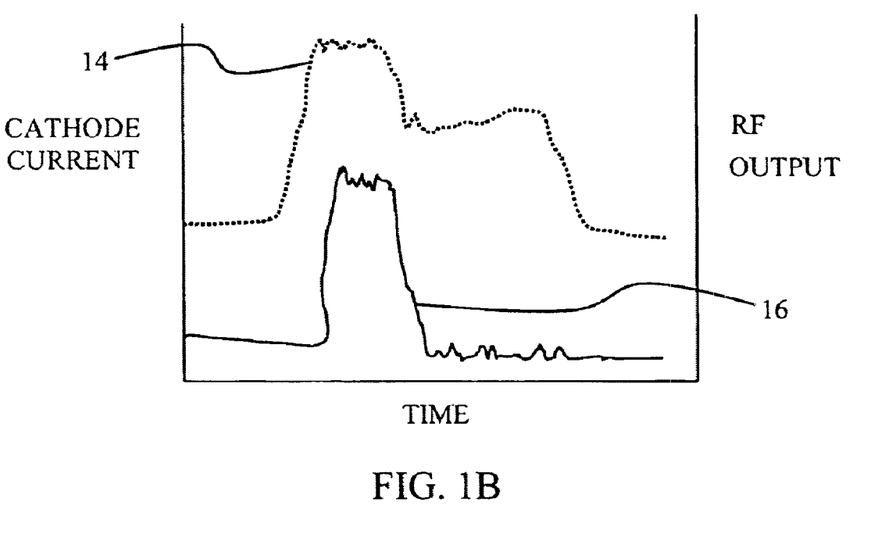

Referring now to FIG. 1A, there is shown a magnitude of a current signal 10 (in amperes) of a cathode current sensor, such as one monitoring a 2J56 magnetron, when a good RF signal 12 is being emitted. The output signal is typically the magnitude of the cathode current, denoted as FIG. 1B shows a magnitude of a current signal 14 of a cathode current sensor monitoring a 2J56 magnetron when a bad RF signal 16 is emitted. Signals 14 and 16 represent anomalous behavior, but do not by themselves allow an identification of a failure as originating in the magnetron's trigger sources, microwave tube or other modulator electronics.

Figure 2A:
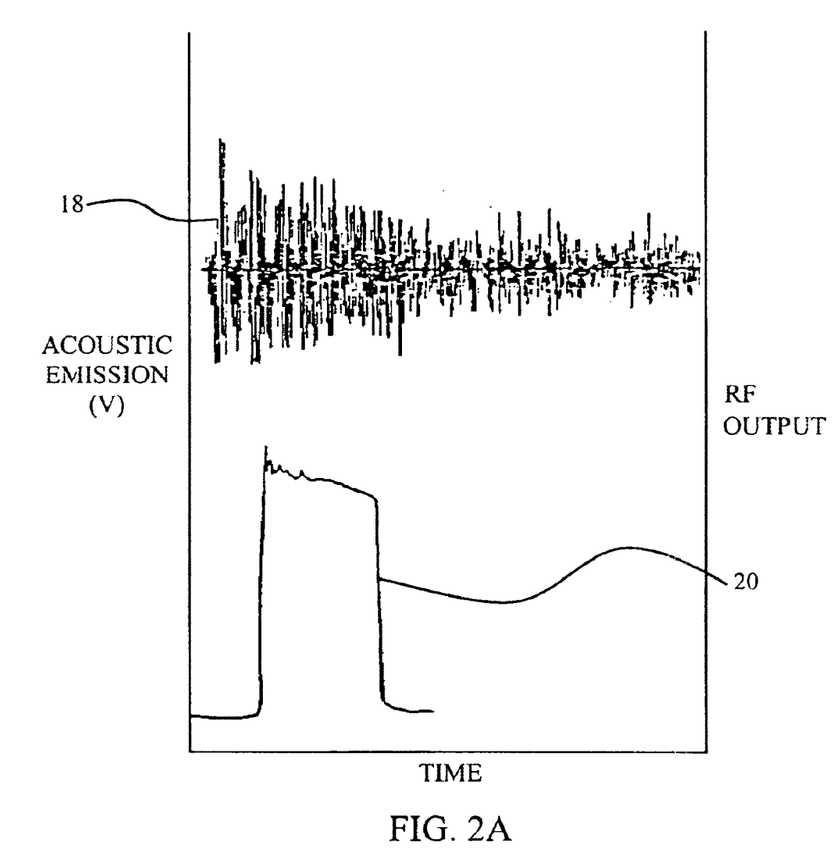
FIGS. 2A–2B illustrate acoustic emissions of a non-degraded and degraded electromagnetic radiating source, respectively.
Figure 2B:
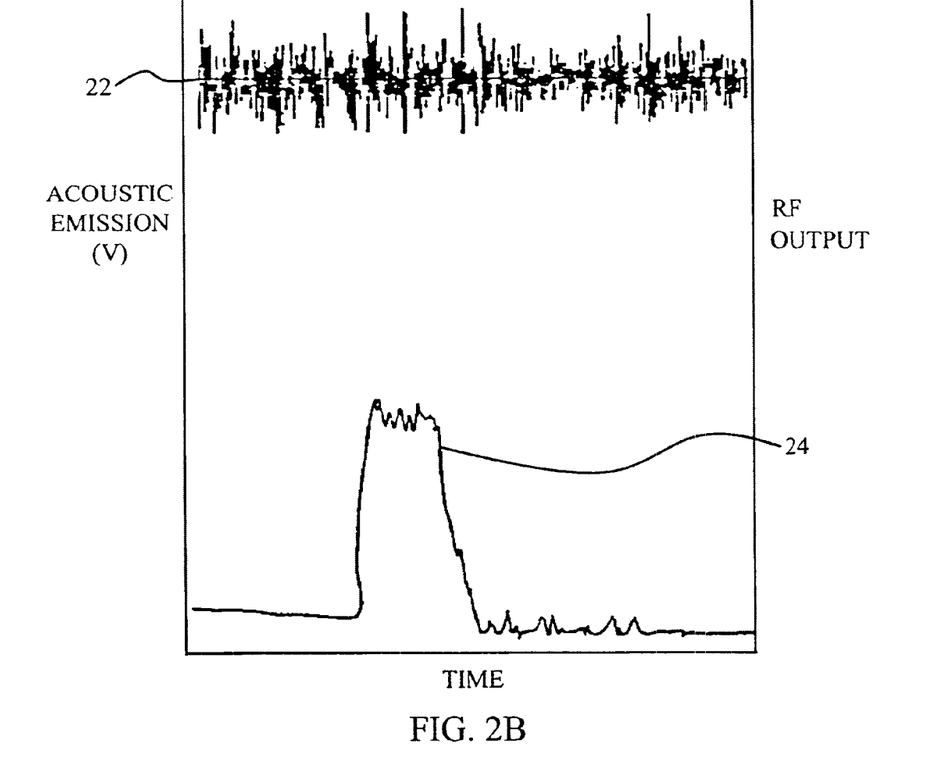

Another example of a sensor that may be used is an acoustic emission sensor suitably disposed to sense acoustic emissions from an operating electromagnetic radiating tube system, such as one incorporating a 2J56 magnetron for example. FIG. 2A shows an output signal 18 (in volts) of an acoustic emission sensor when a good RF signal 20 has been emitted from the system. FIG. 2B shows a characteristic output signal 22 of an acoustic emission sensor monitoring a 2J56 magnetron when a faulty RF signal 24 has been emitted. The acoustic output signal has an anomalous integrated energy. In this case, a decrease in acoustic signal energy corresponds to an anomalous RF pulse. These anomalous signatures do not by themselves allow an identification of a failure as originating in the magnetron trigger sources, microwave tube or other modulator electronics.

Figure 3:
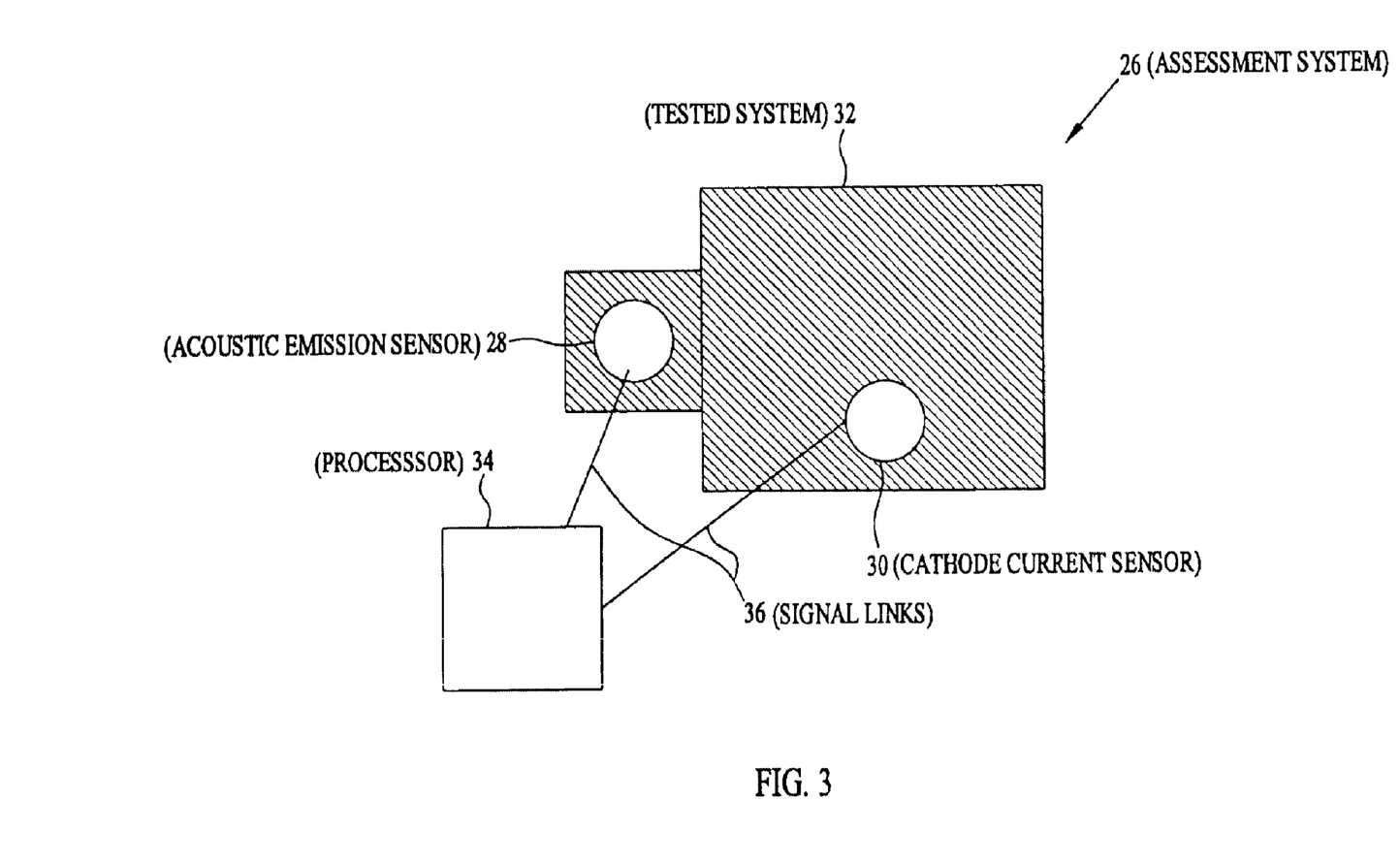
FIG. 3 is a general block diagram illustrating a system incorporating an electromagnetic radiating device wherein sensors are disposed to monitor the system.

FIG. 3 is a general block diagram illustrating an electromagnetic radiating tube assessment system 26 including an acoustic emission sensor 28 and a cathode current sensor 30 operably coupled to a system 32 which in this embodiment is a transmitter of electromagnetic energy, for example a radar transmitter using a klystyron. Assessment system 26 also includes a processor 34 and links 36 to allow signals acquired from the acoustic emission sensor and cathode current sensor to be processed by the processor.

Figure 4A:
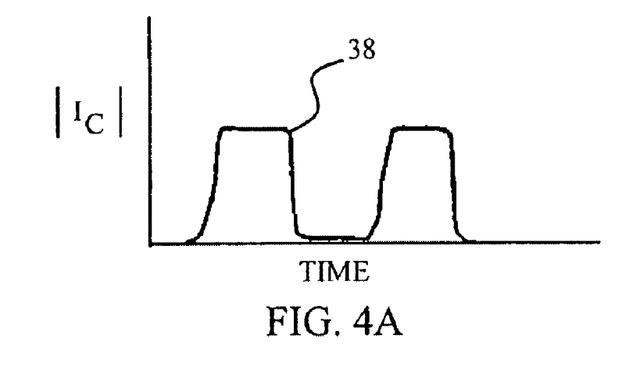
FIGS. 4A–4C describe current, acoustic and combined sensor data as may be used to monitor an electromagnetic radiating tube system.
Figure 4B:
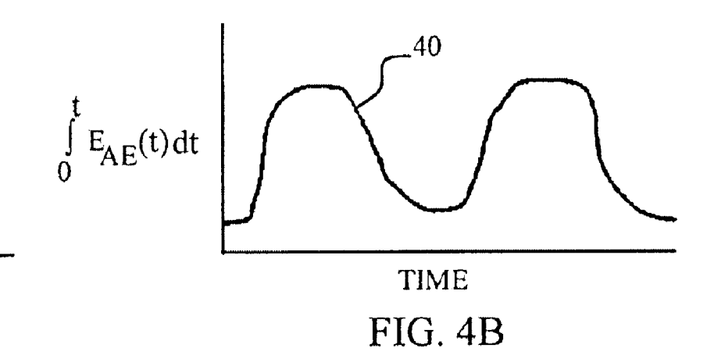

FIG. 4A shows the magnitude of the cathode current 38 ($I_C$) as may be sensed by cathode current sensor 30 of FIG. 3. FIG. 4B shows the integrated acoustic emission energy 40 ($E_{AE}$) as may be sensed by acoustic emission sensor 28 of FIG. 3.

Figure 4C:
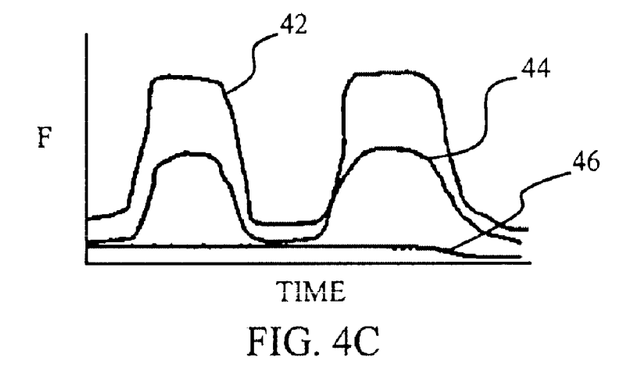

FIG. 4C shows the combined failure function, F, for a particular placement of an acoustic emission sensor whose parameter is represented by $E_{AE}$ and a current sensor whose parameter is represented by $I_C$, where $$F = |I_C| + \int_0^t E_{AE}(t)\,dt$$

FIG. 4C illustrates the outcome of this function for an electromagnetic radiating system performing under different operating modes: normal operation 42; klystron failure 44; and modulator failure 46. By combining sensor information in failure function F, it is possible to differentiate between various failure modes of a system utilizing an electromagnetic radiating tube. It should be noted that though the above, two-parameter, failure function is described in terms of adding the parameter quantities, the addition operation may alternatively be replaced by a subtraction operation. Additionally, the addition operation above may alternatively replaced by a multiplication process or any other mathematical operation wherein the characteristic signature of failure F can be approximated by a polynomial expression.

Figure 5:
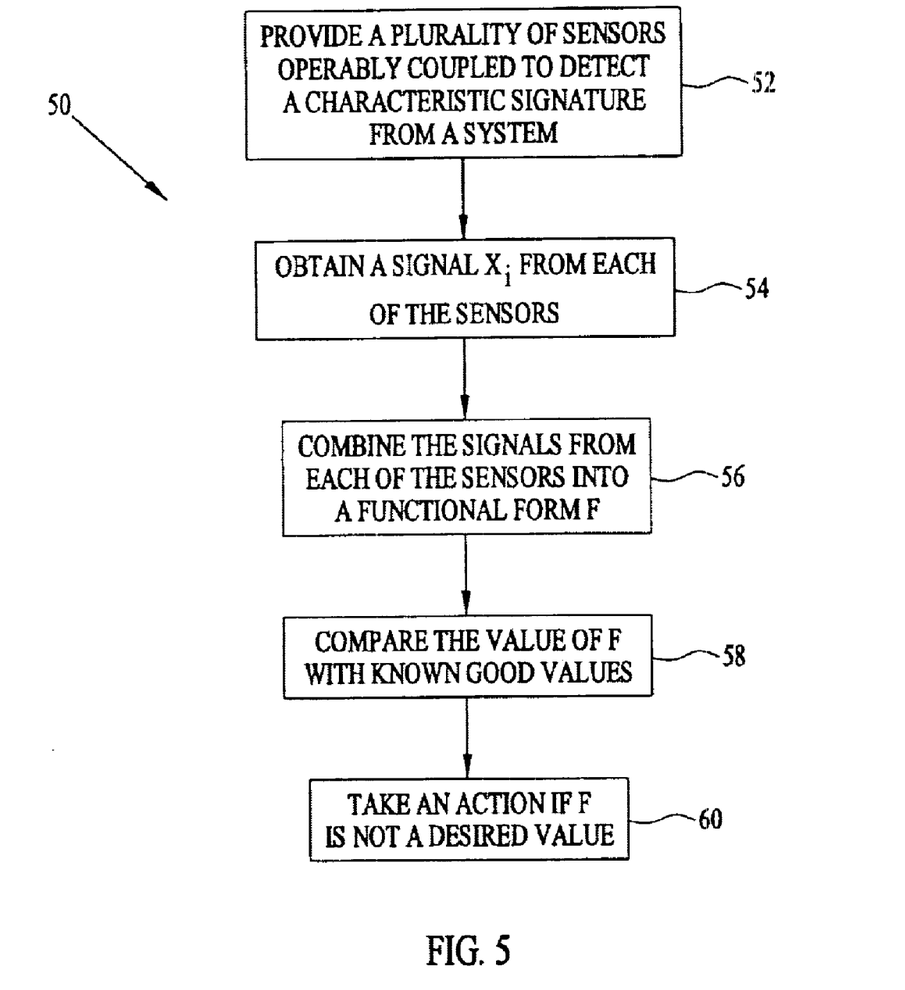
FIG. 5 is a flowchart describing a process by which an electromagnetic radiating device system may be assessed.

Referring to FIG. 5, there is illustrated a flow chart wherein a process 50 of assessing an electromagnetic radiating tube system is described. This process includes a step 52 of providing a plurality of sensors that are operably coupled to an electromagnetic radiating tube system to detect a characteristic signature of the system. Following is a step 54 of obtaining a signal $x_1$ from each of the sensors. Next is combining the signals from each of the sensors into a functional form F, shown as step 56. Following step 56 is step 58 wherein a comparison of assessed value F is made with known good values for F. A final step 60 includes taking an action if the assessed value F is not an acceptable value.

Figure 6:
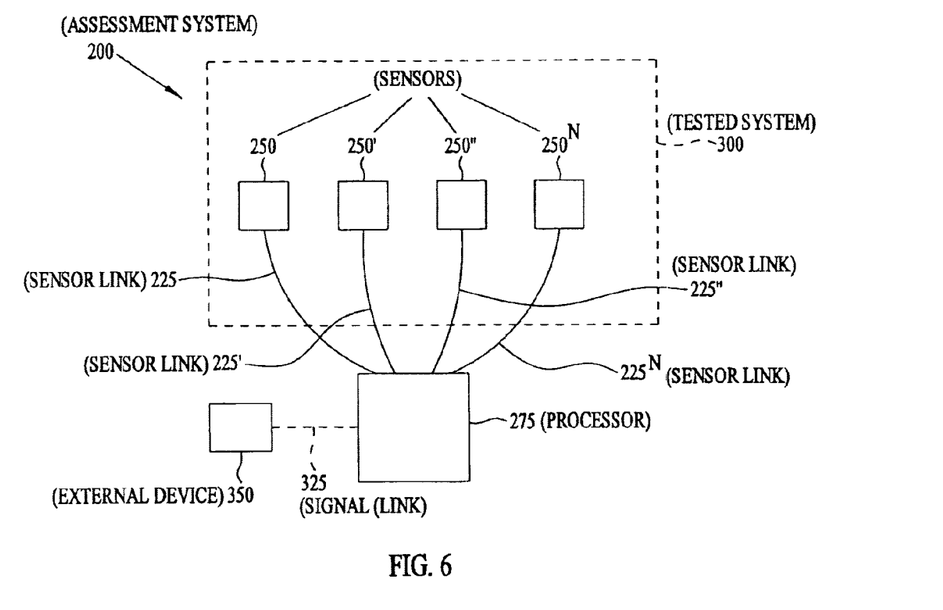
FIG. 6 illustrates an electromagnetic radiating device system wherein a plurality of sensors are employed to assess the status of the system.

FIG. 6 shows an electromagnetic radiating tube assessment system 200. Assessment system 200 includes a plurality of sensors 250, 250', 250", . . . , $250^n$ that are disposed and operably coupled to electromagnetic radiating tube system 300 to sense any of a variety of system characteristics. Links 225, 225', 225", . . . , $225^n$ between the sensors and the processor allow sensor information to be exchanged with the processor. Processor 275 is programmed to combine the signals from sensors 250, 250', 250", . . . , $250^n$ according to the formula:

$$F = F(x_1, x_2) = a + bx_1 + cx_2 + dx_1 x_2 + ex_1^2 x_2 + fx_1 x_2^2 + \ldots$$

and compare the function outcome with a function outcome associated with one or more known good values. If assessed value F is outside a desired range an action, the value may be communicated via link 325 to an external device 350 for notification or actuation of other devices.

Figure 7:
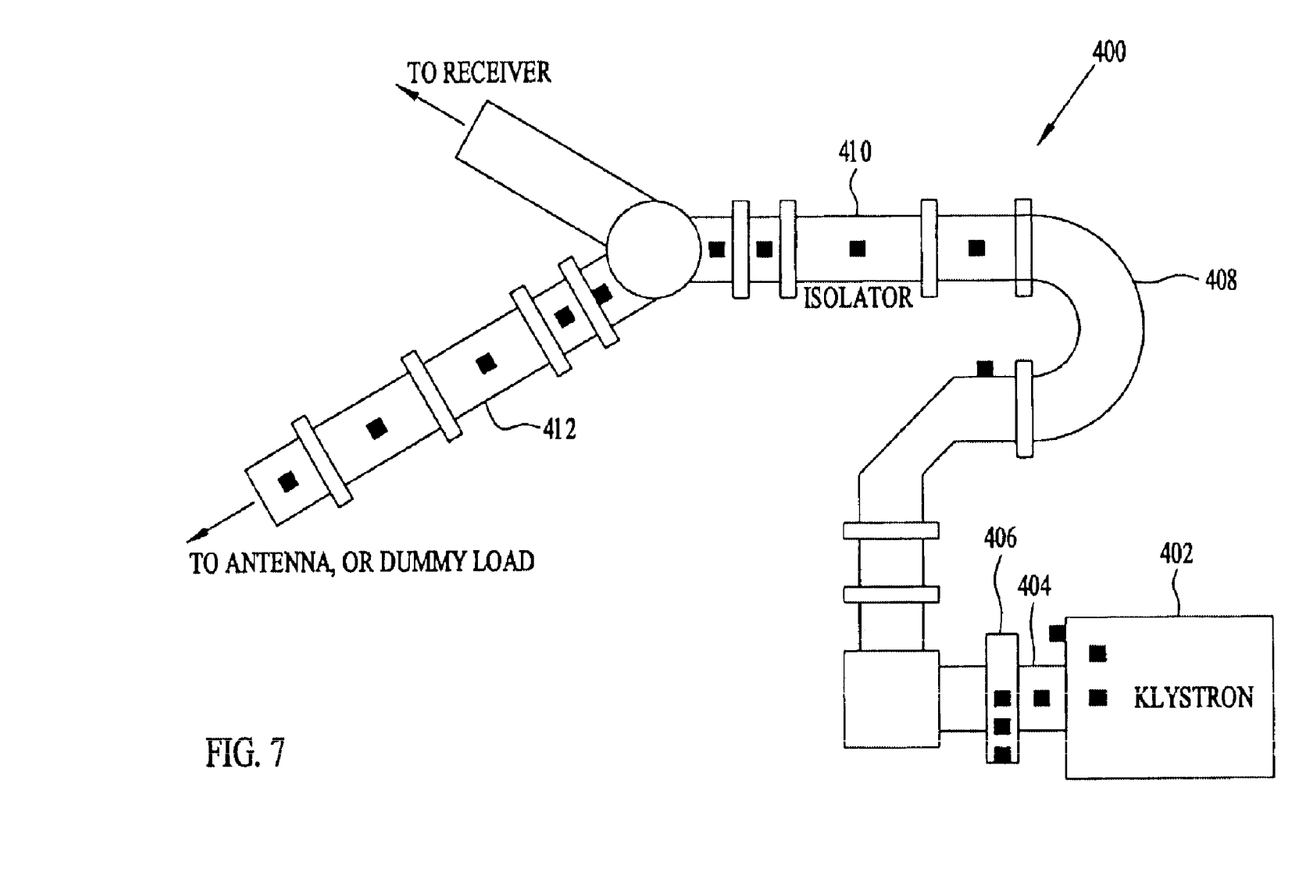
FIG. 7 illustrates an exemplary electromagnetic radiating tube system wherein sensors are employed according to the description found herein.

FIG. 7 illustrates exemplary placement of system sensors for a klystron equipped electromagnetic radiating tube system 400 shown by way of example. The sensors are shown as small black squares and are disposed along klystron 402, coax 404, low-pass filter 406, waveguide 408, isolator 410 and waveguide 412.

By incorporating a plurality of sensors to assess the status of an electromagnetic radiating tube system and by appropriately combining the sensor information, the effectiveness of the sensor data is enhanced over that of analyzing the sensor data separately. This method has uses in detecting and predicting failures in electromagnetic radiating devices such as high-power microwave tubes and when used in a RADAR system, will provide improvements in readiness, performance, maintainability and reliability by keeping operators constantly apprized of the condition of the tubes. This method will reduce labor upkeep costs by reducing the amount of time needed to locate and correct electromagnetic radiating tube system malfunctions.

The invention has wide applications and may use any variety or plurality of sensors including but not limited to: electrical, magnetic, electromagnetic, thermal, acoustic, optical, ionizing radiation and chemical sensors. The parameters used in the failure algorithm may be selected for optimized performance based on the specific system being monitored.

Obviously, many modifications and variations of the invention are possible in light of the above description. It is therefore to be understood that within the scope of the claims the invention may be practiced otherwise than as has been specifically described.

What is claimed is:

1. A method for detecting degradation of an electromagnetic radiating tube system comprising the steps of:
   collecting sensor data values X from a plurality of n sensors disposed to sense operating characteristics of an operating electromagnetic radiating tube system;
   entering said sensor data values X into the function $F = F(x_1, x_2, \ldots, x_t) =$ $$\sum_{k=1}^{n}\sum_{j=1}^{n}\sum_{k=0}^{\infty}\sum_{l=0}^{\infty} c_{ijkl} x_i^k x_j^l$$

where $C_{ijkl}$ are calculation coefficients, and $X_i^k$, $X_j^l$ correspond to each of an n number of sensor parameters and F corresponds to a value indicative of degradation of said operating electromagnetic radiating tube system.

2. The method of claim 1 wherein said radar transmitting tube is one chosen from a group including a magnetron, a traveling wave tube and a klystron.

3. A The method according to claim 1 wherein said method includes:

using acoustic emissions data as one of said sensor data values x.

4. The method according to claim 3 wherein said electromagnetic radiating tube system includes an electromagnetic radiating tube that is a radar transmitting tube.

5. The method according to claim 4 wherein said radar transmitting tube is one chosen from a group including a magnetron, a traveling wave tube and a klystron.

6. The method according to claim 1 wherein said method includes:

using current sensed at a cathode of said tube as one of said sensor data values x.

7. The method according to claim 6 wherein said electromagnetic radiating tube system includes an electromagnetic radiating tube that is a radar transmitting tube.

8. The method according to claim 7 wherein said radar transmitting tube is one chosen from a group including a magnetron, a traveling wave tube and a klystron.

9. The method according to claim 3 wherein said method includes:

using current sensed at a cathode of said tube as one of said sensor data values x.

10. The method according to claim 9 wherein said electromagnetic radiating tube system includes an electromagnetic radiating tube that is a radar transmitting tube.

11. The method according to claim 10 wherein said radar transmitting tube is one chosen from a group including a magnetron, a traveling wave tube and a klystron.

* * * * *